United States Patent
Tamaki

(10) Patent No.: US 9,369,010 B2
(45) Date of Patent: Jun. 14, 2016

(54) STATOR OF ELECTRIC MOTOR INCLUDING RESIN INJECTED BY INJECTION MOLDING

(71) Applicant: Fanuc Corporation, Yamanashi (JP)

(72) Inventor: Takeshi Tamaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 106 days.

(21) Appl. No.: 14/272,888

(22) Filed: May 8, 2014

(65) Prior Publication Data

US 2014/0333158 A1 Nov. 13, 2014

(30) Foreign Application Priority Data

May 10, 2013 (JP) .................. 2013-100461

(51) Int. Cl.
*H02K 1/12* (2006.01)
*H02K 5/08* (2006.01)
*H02K 15/12* (2006.01)

(52) U.S. Cl.
CPC .. *H02K 1/12* (2013.01); *H02K 5/08* (2013.01); *H02K 15/12* (2013.01)

(58) Field of Classification Search
CPC ...................................... H02K 15/11
USPC ..................................... 310/43, 44
See application file for complete search history.

(56) References Cited

U.S. PATENT DOCUMENTS

| | | | | |
|---|---|---|---|---|
| 6,058,593 A | * | 5/2000 | Siess | 29/596 |
| 2004/0061386 A1 | * | 4/2004 | Amagi et al. | 310/43 |
| 2007/0103011 A1 | * | 5/2007 | Neal | 310/67 R |
| 2007/0128307 A1 | * | 6/2007 | Maeda et al. | 425/542 |
| 2007/0134368 A1 | * | 6/2007 | Okamoto et al. | 425/577 |
| 2007/0222306 A1 | * | 9/2007 | Hultman et al. | 310/44 |

FOREIGN PATENT DOCUMENTS

| | | |
|---|---|---|
| JP | H06-233489 | 8/1994 |
| JP | 07-274454 | 10/1995 |
| JP | 2008-109848 | 5/2008 |
| JP | 2008-178163 | 7/2008 |
| JP | 2012-115050 | 6/2012 |

* cited by examiner

*Primary Examiner* — Naishadh Desai
(74) *Attorney, Agent, or Firm* — RatnerPrestia

(57) ABSTRACT

In a stator of an electric motor having a resin molding portion formed in an inner circumferential portion and an outer circumferential portion by means of injection molding, a partition member for partitioning the inner circumferential portion and the outer circumferential portion of the stator is provided in an axial end portion of the stator. Resin injected from the axial end portion flows in a bifurcated passage into the inner circumferential portion and the outer circumferential portion. The partition member may be provided with a resin passage which allows resin to flow from the axial end portion of the stator to the outer circumferential portion.

6 Claims, 13 Drawing Sheets

STATOR OF ELECTRIC MOTOR INCLUDING RESIN INJECTED BY INJECTION MOLDING

BACKGROUND OF THE INVENTION

1. Field of the Invention

The present invention relates to a stator of an electric motor.

2. Description of the Related Art

In order to fix a winding wound around a stator core, and enhance a heat dissipating effect from the winding, the stator of an electric motor is commonly provided with a resin molding section in an inner circumferential portion. Further, in order to enhance a water-proof property or omit a process of painting of an outer surface of the motor, a resin molding portion may also be formed in an outer circumferential portion of the stator. The resin molding portion preferably formed in the outer circumferential portion of the stator is preferably as thin as possible, for the purpose of downsizing the motor and efficiently releasing heat from the stator core to the outside. However, if a thin resin molding portion is formed by means of injection molding, a passage of resin is necessarily narrow, and therefore, it may be impossible to achieve sufficiently high fluidity of resin. As a result, there may be local portions in which resin is unfilled.

JP-A-2012-115050, JP-B-3552266 and JP-B-5124219 disclose a configuration in which a resin molding portion is formed in the circumference of the stator. JP-A-2012-115050 discloses a stator of an electric motor which includes a frame integrally formed with a stator core, a winding and a pair of insulators for insulating the stator core and the winding by way of resin. In order to fill resin into a gap formed between the pair of insulators, a through-hole extending from an outer circumferential portion to an inner circumferential portion of the stator core is formed as a passage of resin. JP-B-3552266 discloses a configuration in which a resin frame is formed so as to be integrally formed with a stator core and a coil wound round the stator core. Further, JP-A-2012-115050 discloses a configuration a resin molding portion is formed so as to cover an circumference of an armature of an electric motor.

There is a need for a stator of an electric motor in which an outer circumferential portion of the stator can be filled with resin.

SUMMARY OF THE INVENTION

According to a first aspect of the present invention, a stator of an electric motor comprising a resin molding portion formed in an inner circumferential portion and an outer circumferential portion by means of injection molding, the stator comprising a partition member provided in an axial end portion of the stator and adapted to partition the inner circumferential portion and the outer circumferential portion, wherein the partitioning member makes resin injected from the axial end portion flow in a bifurcated passage into the inner circumferential portion and the outer circumferential portion, is provided.

According to a second aspect of the present invention, the stator according to the first aspect, wherein the partition member comprises a resin passage which allows resin to flow from the axial end portion of the stator to the outer circumferential portion, is provided.

According to a third aspect of the present invention, the stator according to the second aspect, wherein the resin passage is defined by a through-hole extending from an axial end face of the partition member to the outer circumferential portion of the stator, is provided.

According to a fourth aspect of the present invention, the stator according to the second aspect, wherein the resin passage is defined by a groove extending from an axial end face of the partition member to the outer circumferential portion of the stator, is provided.

According to a fifth aspect of the present invention, the stator according to any one of the first to fourth aspects, further comprising a groove is formed on an axial end face of the stator by means of the injection molding for forming the resin molding portion, is provided.

These and other objects, features and advantages of the present invention will become more apparent in light of the detailed description of exemplary embodiments thereof as illustrated by the drawings.

DETAILED DESCRIPTION OF THE INVENTION

Referring to the accompanying drawings, embodiments of the present invention will be described below. Constituent elements of the illustrated embodiments may be modified in size in relation to one another for better understanding of the present invention. The same constituent elements are designated with the same referential numeral.

Figure 1:
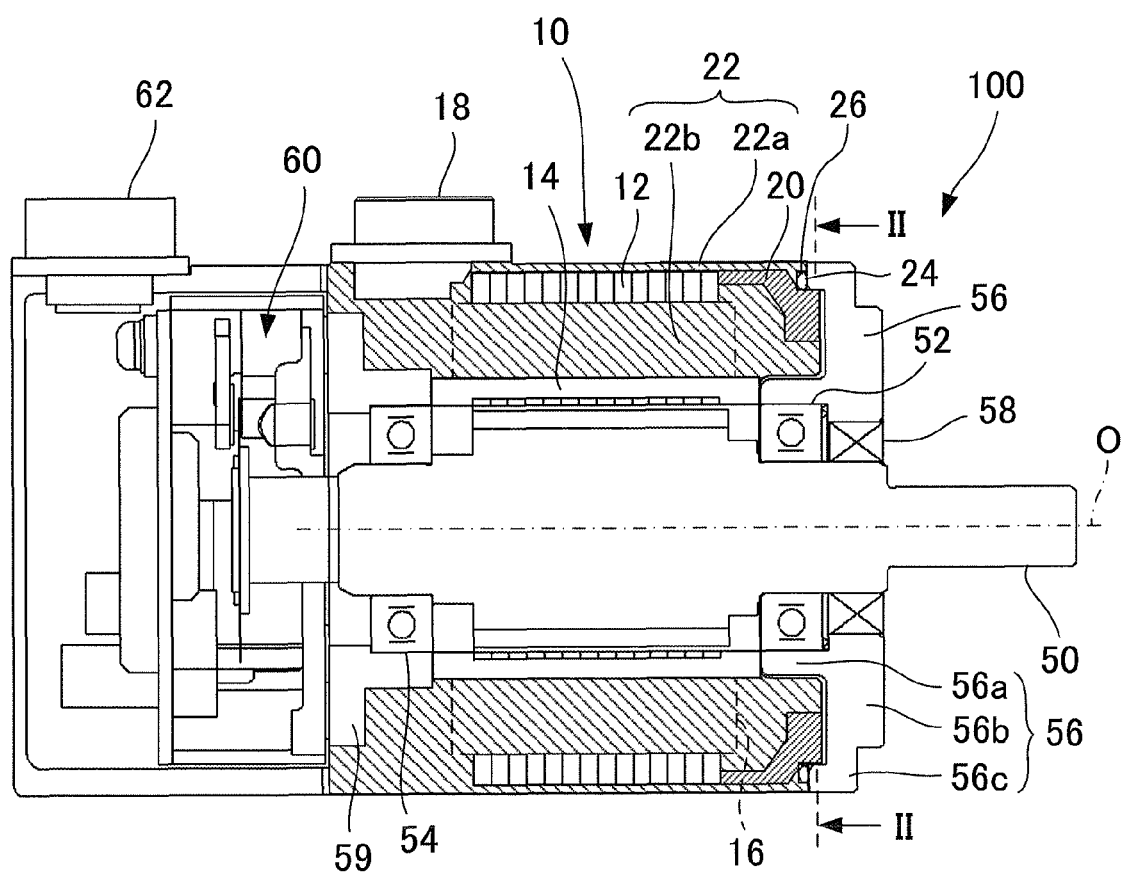
FIG. 1 is a schematic sectional view showing a configuration of an electric motor according to a first embodiment.
Figure 2:
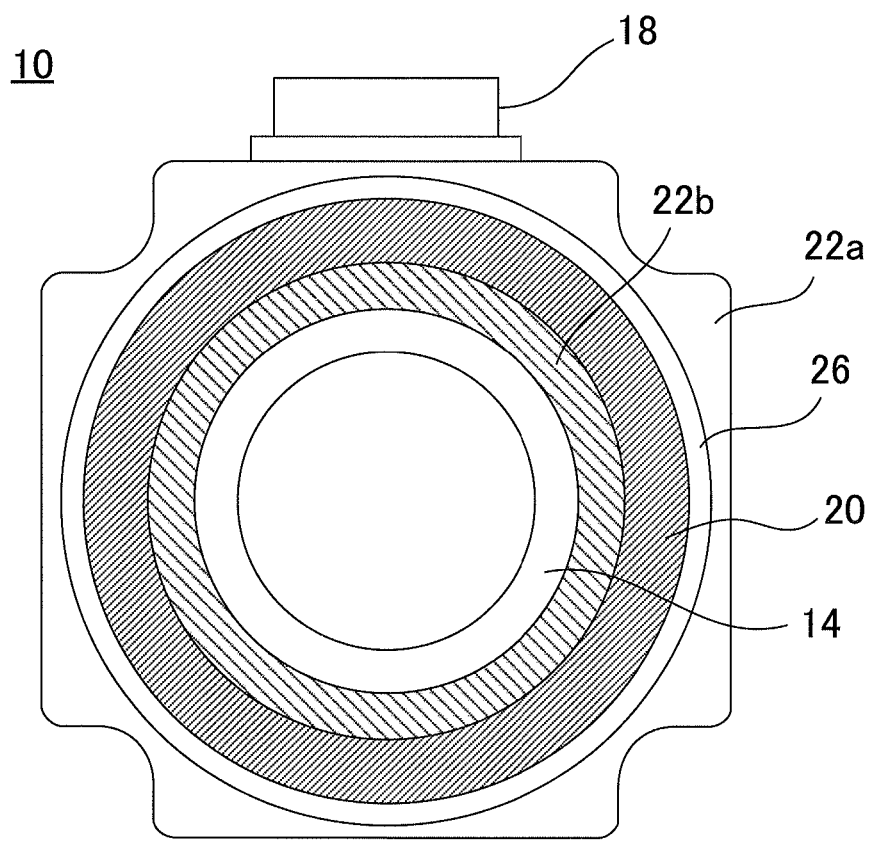
FIG. 2 is a side view showing a stator of the electric motor shown in FIG. 1.

FIG. 1 is a schematic sectional view showing a configuration of an electric motor 100 according to a first embodiment of the present invention. FIG. 2 is a side view showing a stator 10 of the electric motor 100. The electric motor 100 includes a stator 10, a rotor 50 supported by a front bearing 52 and a rear bearing 54 at the opposite ends of the stator 10, so as to be rotatable round an axis O, and a detector 60 for detecting a position and a speed of the rotor 50. The electric motor 100 further includes a signal connector 62 for transmitting detection signals from the detector 60 to an external control device.

The stator 10 includes a stator core 12 formed from laminated steel plates made of magnetic material, such as silicon steel, and arranged in a direction of the axis O. The stator core 12 includes a generally cylindrical core back; and a plurality of teeth protruding from the core back to the rotor 50, i.e., protruding radially inwardly, and being spaced apart from each other in a circumferential direction. A winding 16 is wound round the teeth through an insulator 14. In FIG. 1, only an end of the insulator 14 on the inside in the radial direction, round which no winding is wound, can be seen. The winding 16 is depicted with dashed lines. An alternating electric current is supplied to the winding 16 through a power source connector 18, so as to generate a rotating magnetic field.

An electric motor to which the present invention can be applied is not limited to any particular type. For example, the electric motor 100 may be configured so that rotary torque is generated in cooperation of the rotating magnetic field generated by the winding 16 with permanent magnets (not shown) arranged on an outer circumference of the rotor 50. Alternatively, the electric motor 100 may be configured so that rotary torque is generated by an induced electric current generated in the rotor 50. Similarly, the stator core 12 is not limited to the laminated core as described above, but it may as well be an integrally formed core.

The front bearing 52 of the stator 10 is held by a flange 56 arranged in one end portion of the stator 10. The flange 56 is attached to the stator core 12 by a known means such as screwing. The stator 10 is formed with a groove 26 for accommodating a packing 24 on an end face opposed to the flange 56.

The flange 56 includes a bearing holding portion 56a extending radially outside the front bearing 52, so as to hold the front bearing 52, a main body portion 56b extending generally radially outwardly from an end portion of the bearing holding portion 56a, and a fitting portion 56c having a complementary shape to a housing 20 of the stator 10, which will be further describe below, so as to be fitted to the housing 20. Further, an oil seal 58 is arranged between the flange 56 and the rotor 50. The rear baring 54, which is arranged on the opposite side of the front bearing 52 of the stator 10, is held on its radially outer side by a generally annular bearing holder 59.

In FIG. 1, a hatched portion around the stator core 12 is a resin molding portion 22 formed from filled resin. The resin molding portion 22 includes an outer molding portion 22a which covers an outer circumference of the stator 12 (in particular, the core back), and an inner molding portion 22b in which the winding 16 is impregnated. As described above, in the present specification, the portion formed radially outside the core back of the stator 10 is referred to as the outer molding portion 22a, and the portion formed radially inside the core back is referred to as the inner molding portion 22b.

At the front end portion of the stator 10 at which the flange 56 is provided, the outer molding portion 22a and the inner molding portion 22b are partitioned from each other in the radial direction by the generally cylindrical housing 20. The housing 20 may be configured so as to cover an end portion (coil end) of the winding 16. The housing 20 may be made of any material, such as resin or metal. The housing 20 may be preferably made of material having a high electric conductivity, such as aluminum or aluminum alloy. In this case, the housing 20 is interposed between the stator 12 and the flange 56, and therefore, the respective members are electrically connected. As a result, a grounding effect for the stator 12 can be improved. In particular, if the housing 20 and flange 56 have a complementary shape so as to be fitted to each other, the housing 20 and the flange 56 come in planar contact with each other. Accordingly, the grounding effect can be considerably improved.

Figure 3A:
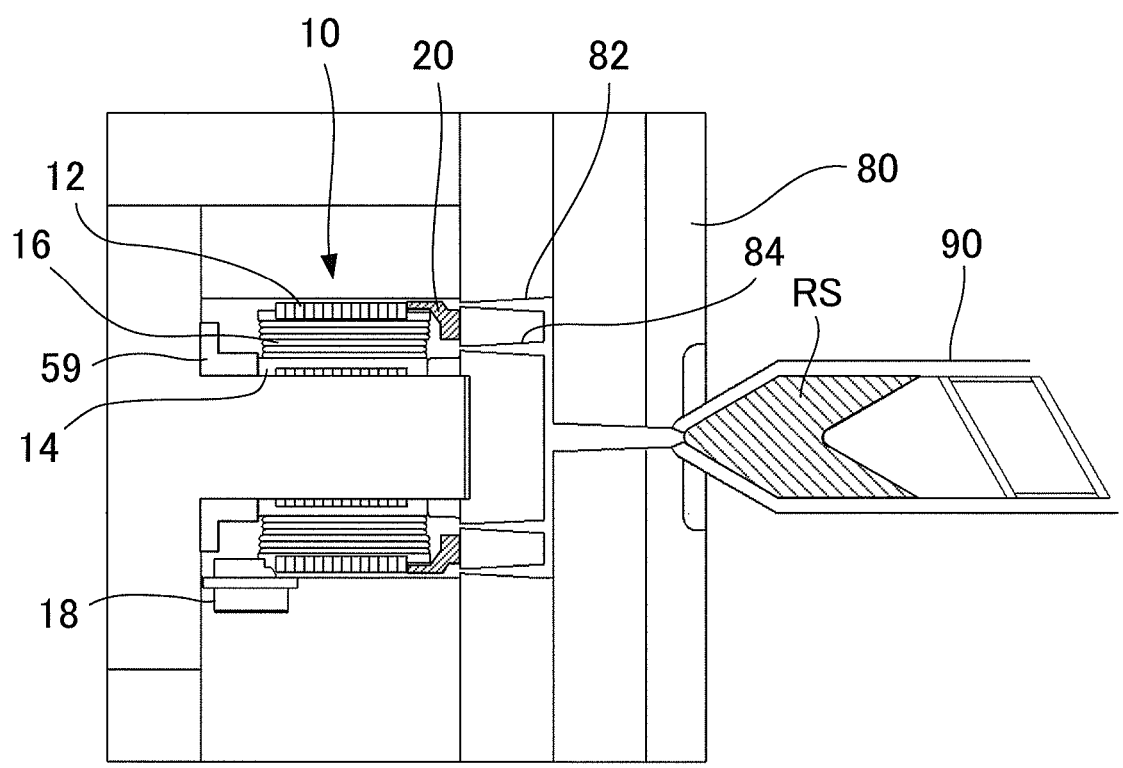
FIG. 3A shows a process of injection molding for forming a resin molding portion in the stator of the electric motor shown in FIG. 1.
Figure 3B:
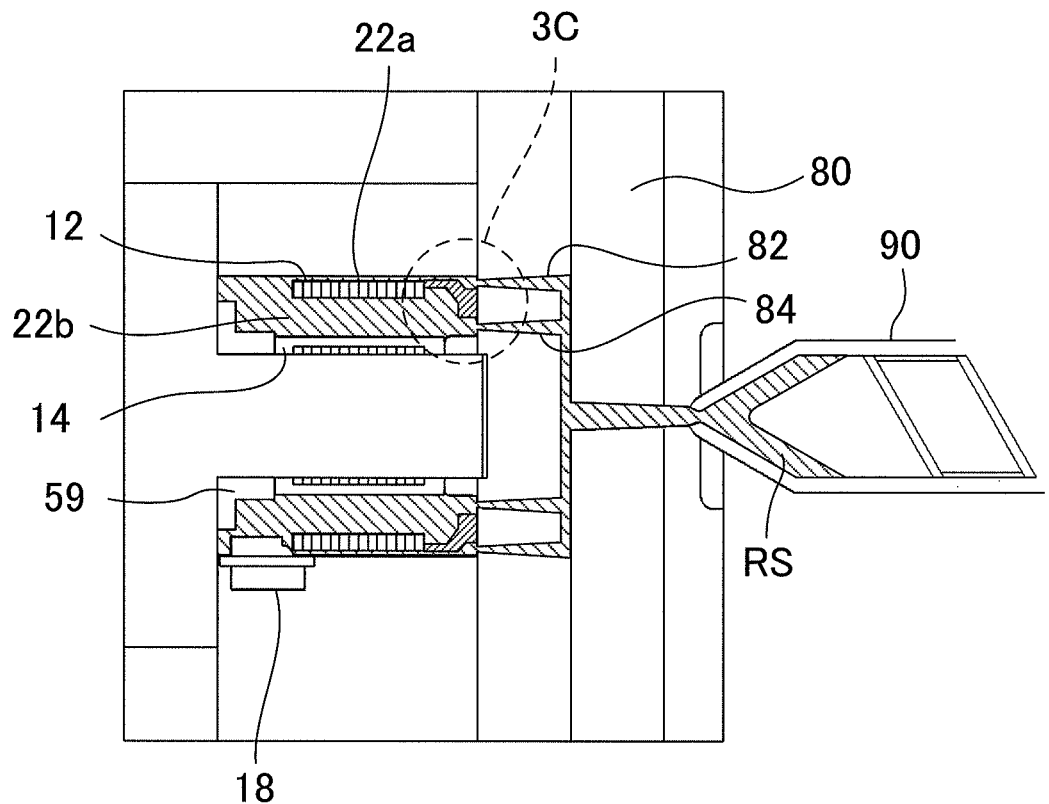
FIG. 3B shows a process of injection molding for forming a resin molding portion in the stator of the electric motor shown in FIG. 1.
Figure 3C:
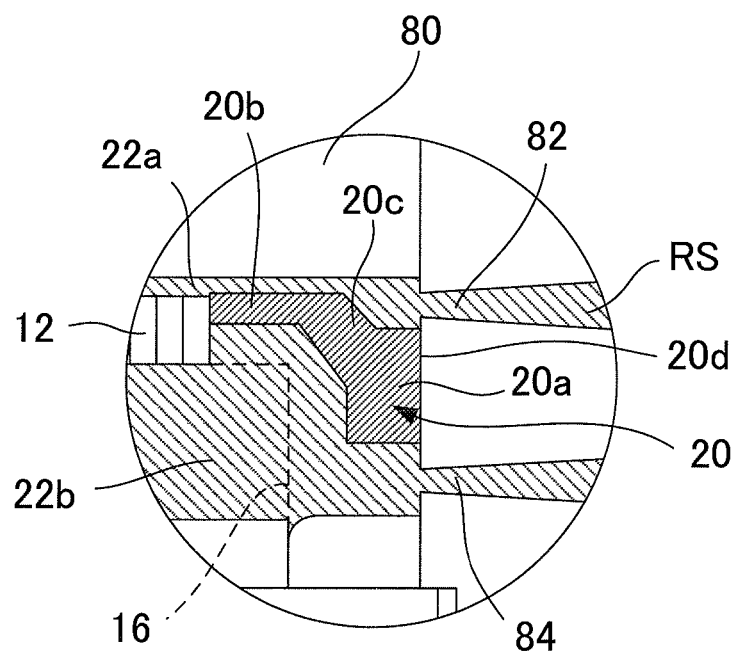
FIG. 3C is a partially enlarged view showing a region 3C of FIG. 3B.

FIGS. 3A and 3B show a process for forming the resin molding portion 22 in the stator 10 of the electric motor 100 according to the first embodiment of the present invention. FIG. 3A shows a state before resin RS is injected from an injection molding device 90 into a mold 80. FIG. 3B shows a state after the mold 80 is filled with the resin RS. FIG. 3C is a partially enlarged view showing a region 3C of FIG. 3B.

In the present embodiment, the inner space near a resin injection inlet of the mold 80 is partitioned by the housing 20 in the radial direction of the stator 10, as shown in the drawing. Therefore, there are an outer gate 82 and an inner gate 84 arranged at the radially outside and inside of the housing 20, respectively. The housing 20 is previously fixed by a known means so as not to move from a predetermined position due to injection pressure. For example, the housing 20 may be screwed to the stator core 12. Alternatively, the housing 20 may be temporarily fixed to the metallic mold 80.

Referring to FIG. 3C, the housing 20 includes an end face portion 20a which has a generally flat end face 20d so as to come in planar contact with the flange 56, an outer edge portion 20b which has an outer diameter larger than the outer diameter of the end face portion 20a and substantially the same as that of the stator core 12, and extends along the direction of the axis O, so as to come in contact with the end portion of the stator core 12, and an expanded diameter portion 20c which extends between the end face portion 20a and the outer edge portion 20b so as to connect them with each other, and has a diameter gradually expanding. As shown in the drawing, the outer gate 82 is arranged in a region formed between the outer surface of the outer mold portion 22a and the end face portion 20a of the housing 20.

As described above, according to the present embodiment, the resin RS injected into the mold 80 flows in a bifurcated passage toward the outer circumferential side and the inner circumferential side of the stator 10 by the housing 20. Therefore, the resin is injected into the region on the outer circumferential side of the stator 10 with sufficiently high pressure, and it is possible to form the thin outer mold portion 22a without a gap.

Figure 4A:
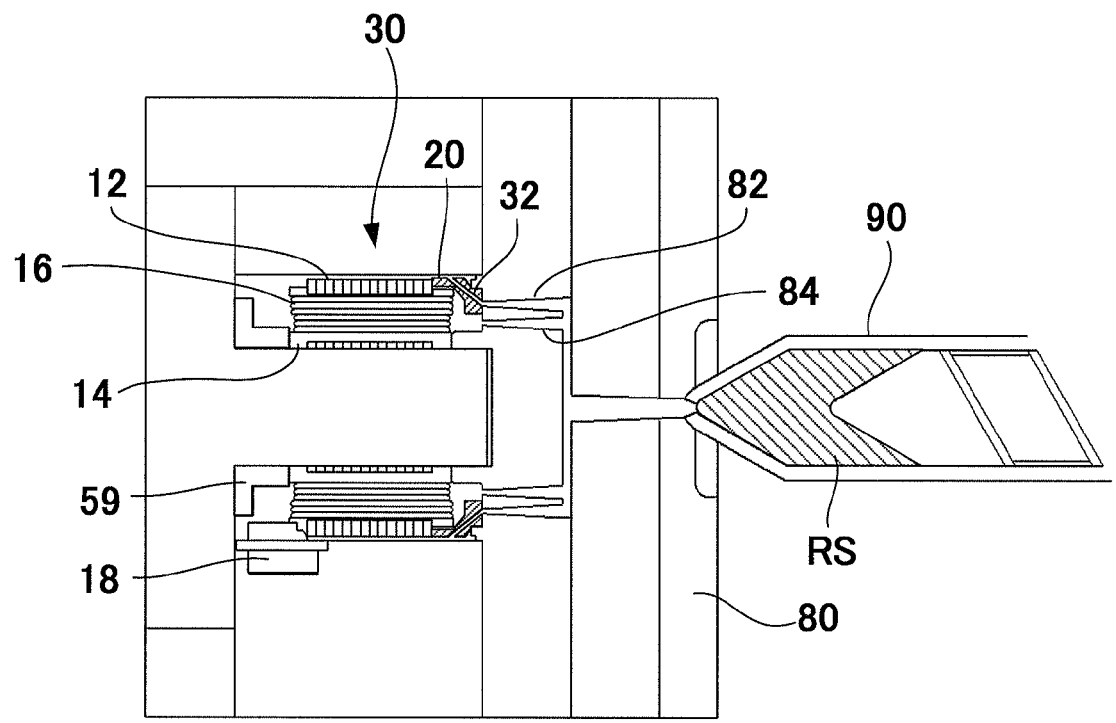
FIG. 4A shows a process of injection molding for forming a resin molding portion in a stator of an electric motor according to a second embodiment.
Figure 4B:
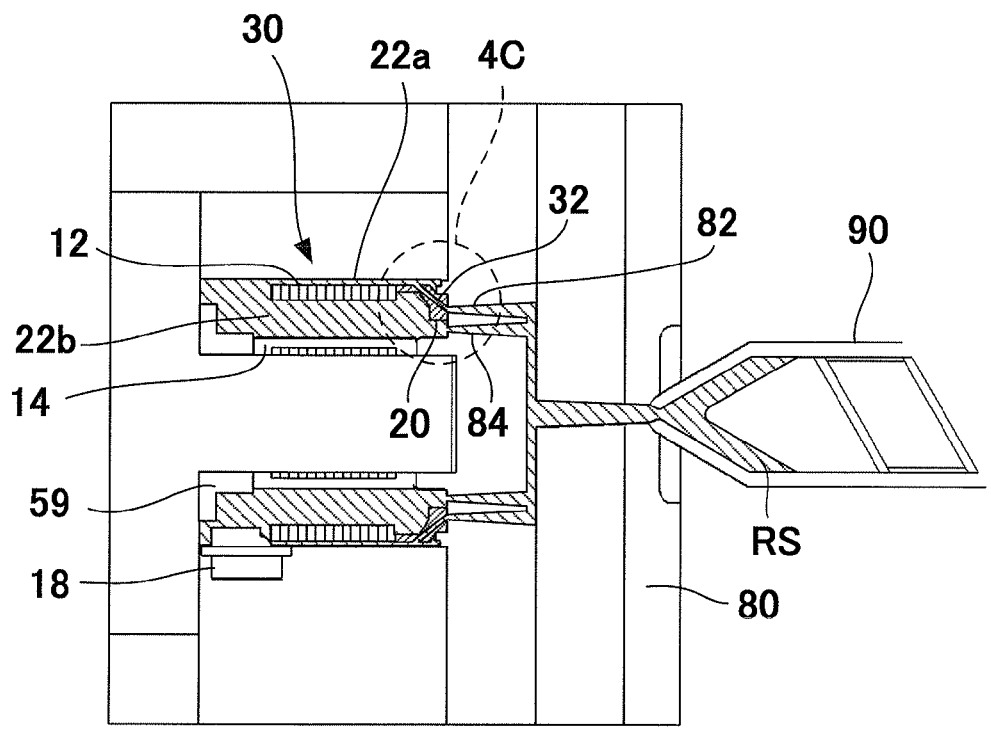
FIG. 4B shows a process of injection molding for forming a resin molding portion in the stator of the electric motor according to the second embodiment.
Figure 4C:
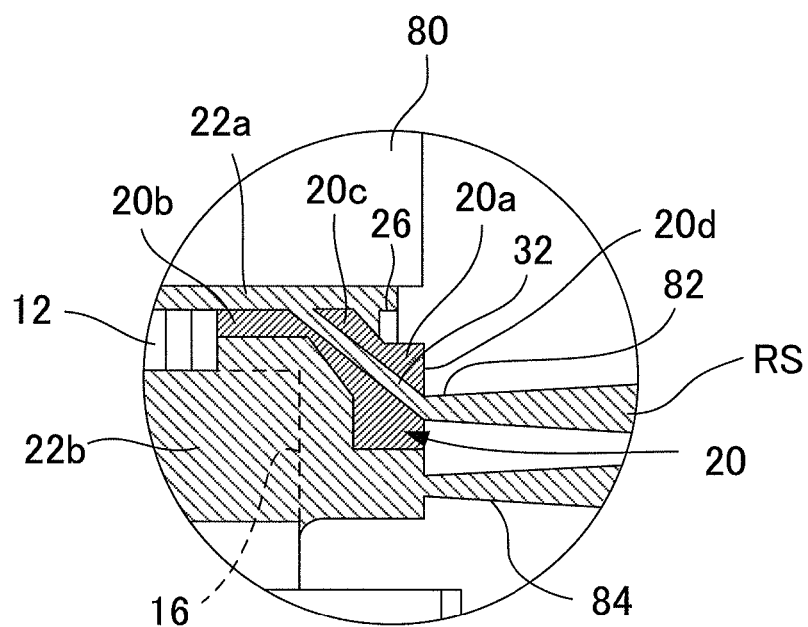
FIG. 4C is a partially enlarged view showing a region 4C of FIG. 4B.

Next, another embodiment will be described below. The matters which have already been described will be omitted from the following explanation as necessary. FIGS. 4A and 4B show an injection molding process for forming a resin molding portion 22 in a stator 30 of an electric motor according to a second embodiment. FIG. 4A shows a state before resin RS is injected from an injection molding device 90 into the mold 80. FIG. 4B shows a state after the mold 80 is filled with the resin RS. FIG. 4C is a partially enlarged view showing a region 4C of FIG. 4B.

In the present embodiment, the housing 20 is formed with a through-hole 32 in communication with the end face 20d of the housing 20 opposed to the flange (see FIG. 1) and an outer circumference of the stator 30. The through-hole 32 extends over the end face portion 20a, the expanded diameter portion 20c and the outer edge portion 20b. There are a plurality of through-holes 32, for example, eight through-holes spaced apart from each other in the circumferential direction (see FIG. 6B).

As can be seen in FIG. 4C, in the present embodiment, the outer gate 82 on the outer circumferential side of the stator 30 is in communication with the through-hole 32 of the housing 20. Therefore, resin RS injected through the outer gate 82 flows into the outer circumferential side of the stator 30 through the through-hole 32, forming the outer molding portion 22a.

According to the present embodiment, in addition to the advantages described in relation to the first embodiment, the groove 26 for accommodating the packing 24 (see FIG. 1) can be simultaneously formed together with the resin molding portion 22 in the same injection molding process. In other words, since the outer gate 82 is arranged closer to the inner circumferential portion of the stator 30 as shown in FIG. 4C, it is possible to freely shape a region on the outer circumferential side of the end face portion 20a of the housing 20. Accordingly, the groove 26 for the packing 24 can be formed on the end face of the stator 30 by means of the injection molding.

If the groove 26 is formed together with the resin molding portion 22 simultaneously by means of the injection molding as described above, the groove 26 has a smooth surface as compared to a similar groove formed by cutting in the after process. Accordingly, the water-proof property can be enhanced. Further, since the after process for forming the groove can be omitted, the manufacturing process can be simplified.

Figure 5A:
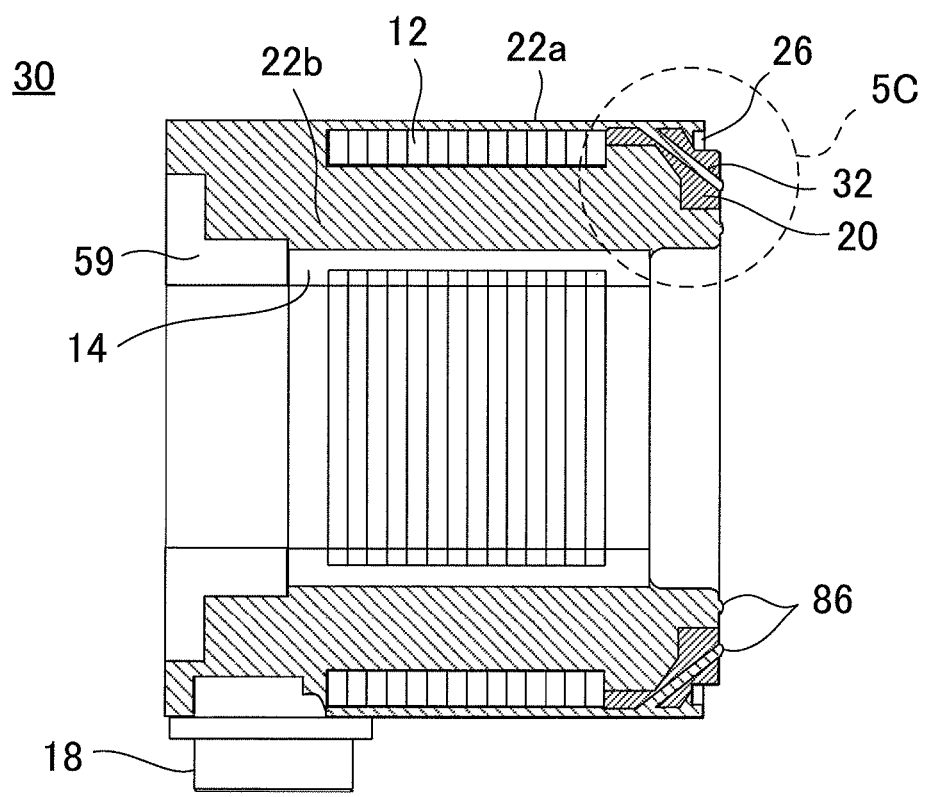
FIG. 5A is a schematic sectional view showing the stator of the second embodiment before carrying out the after-process.
Figure 5B:
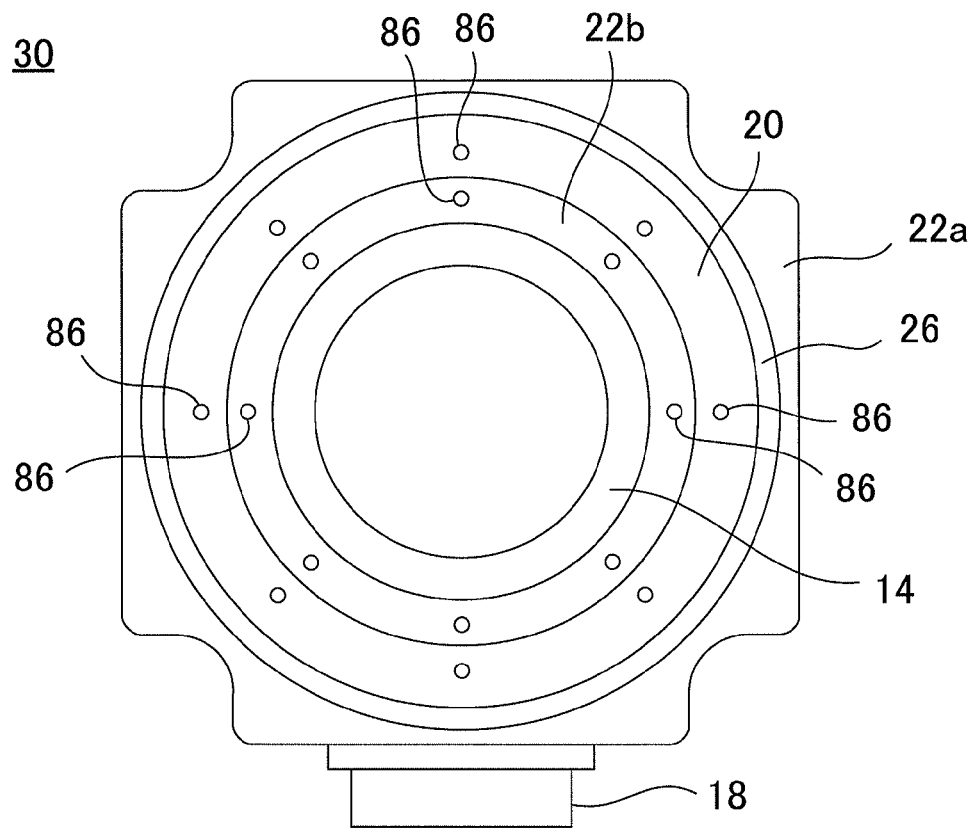
FIG. 5B is a side view showing the stator of FIG. 5A.
Figure 5C:
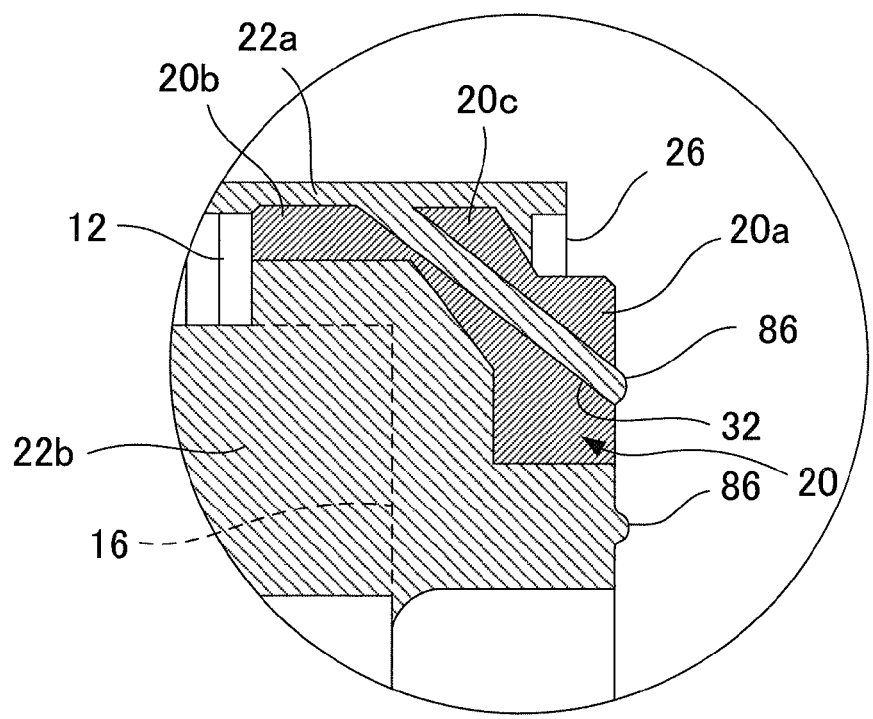
FIG. 5C is a partially enlarged view showing a region 5C of FIG. 5A.

FIG. 5A is a schematic sectional view showing the stator 30 according to the second embodiment before the after process is carried out, and FIG. 5B is a side view thereof. FIG. 5C is a partially enlarged view showing a region 5C of FIG. 5A. FIGS. 5A to 5C show the stator 30 taken out of the mold 80 after the injection molding. As illustrated, the stator 30 is provided with gate marks 86 at positions corresponding to the outer gate 82 and the inner gate 84 (see FIG. 4C), respectively. On the other hand, the groove 26 for accommodating the packing 24 is already formed on the end face of the stator 30 at this stage. Therefore, an additional after process is not required.

Figure 6A:
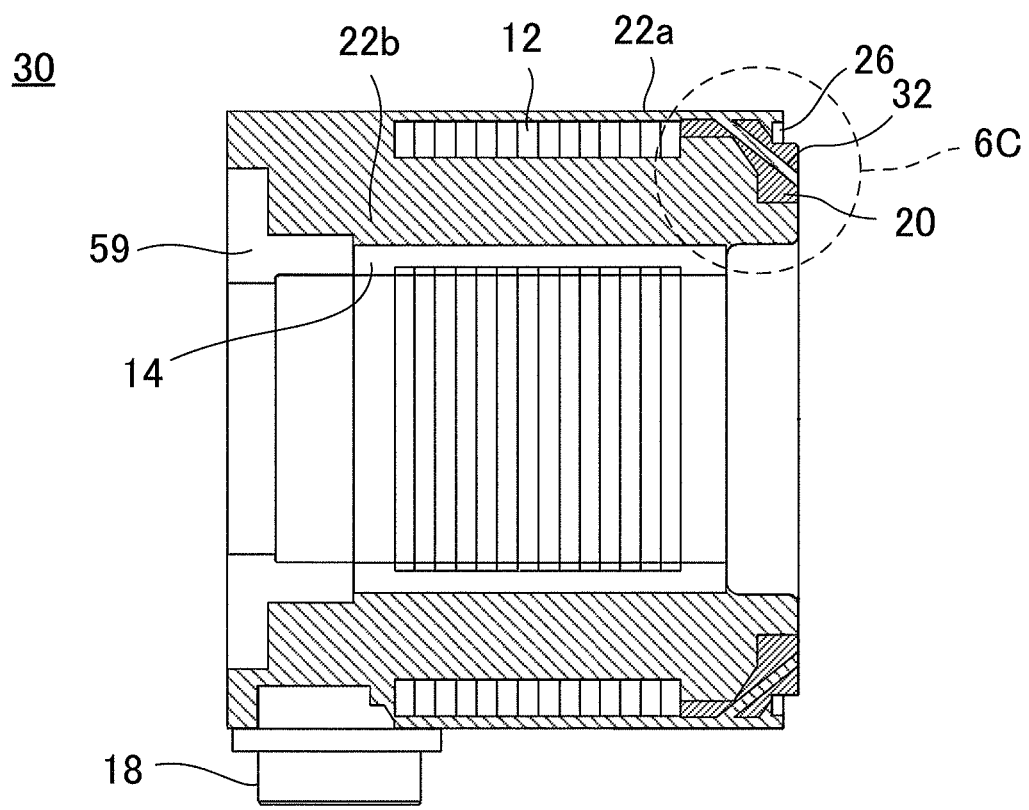
FIG. 6A is a schematic sectional view showing the stator of the second embodiment after carrying out the after-process.
Figure 6B:
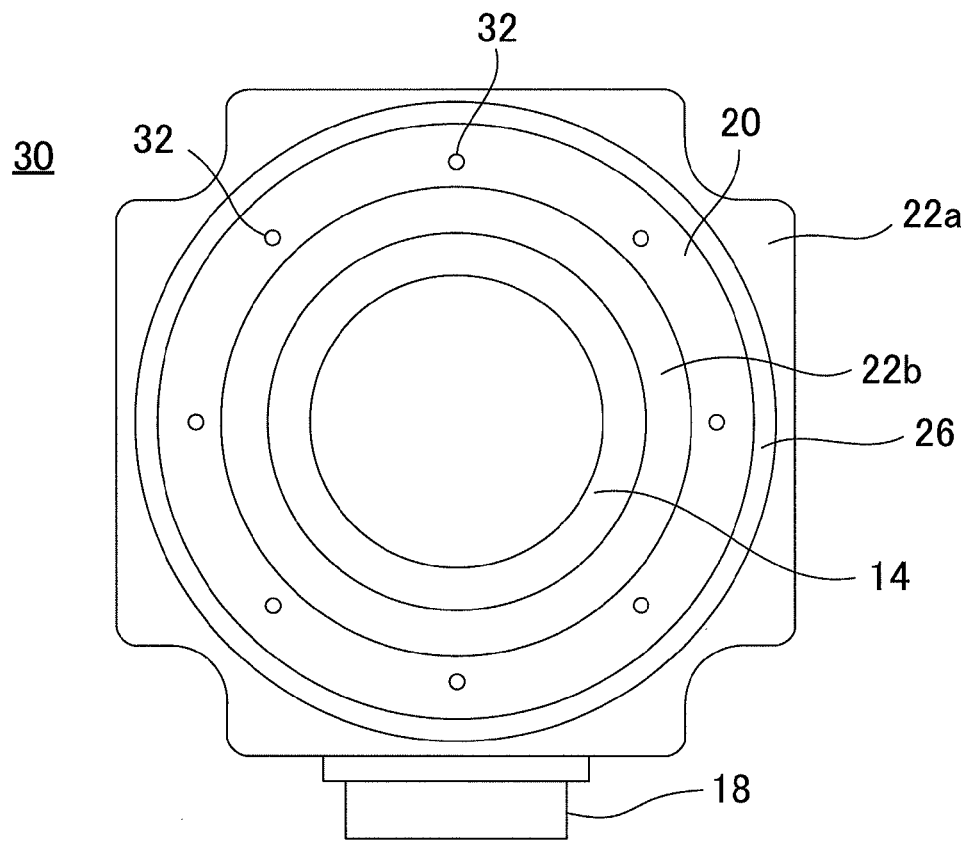
FIG. 6B is a side view showing the stator of FIG. 6A.
Figure 6C:
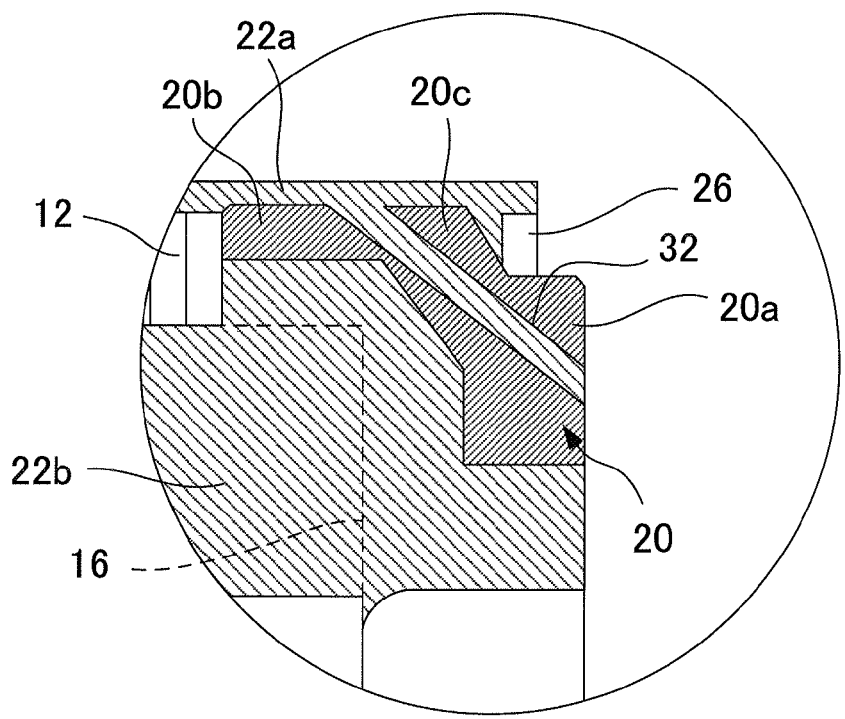
FIG. 6C is a partially enlarged view showing a region 6C of FIG. 6A.

FIG. 6A is a schematic sectional view showing the stator 30 according to the second embodiment after the after process is carried out, and FIG. 6B is a side view thereof. FIG. 6C is a partially enlarged view showing a region 6C of FIG. 6A. As can be seen in comparison with FIGS. 5A to 5C and FIGS. 6A to 6C, the gate marks 86 have been removed by the after process, for example, by cutting. Therefore, the end face of the stator 30 can be smoothly finished.

Figure 7A:
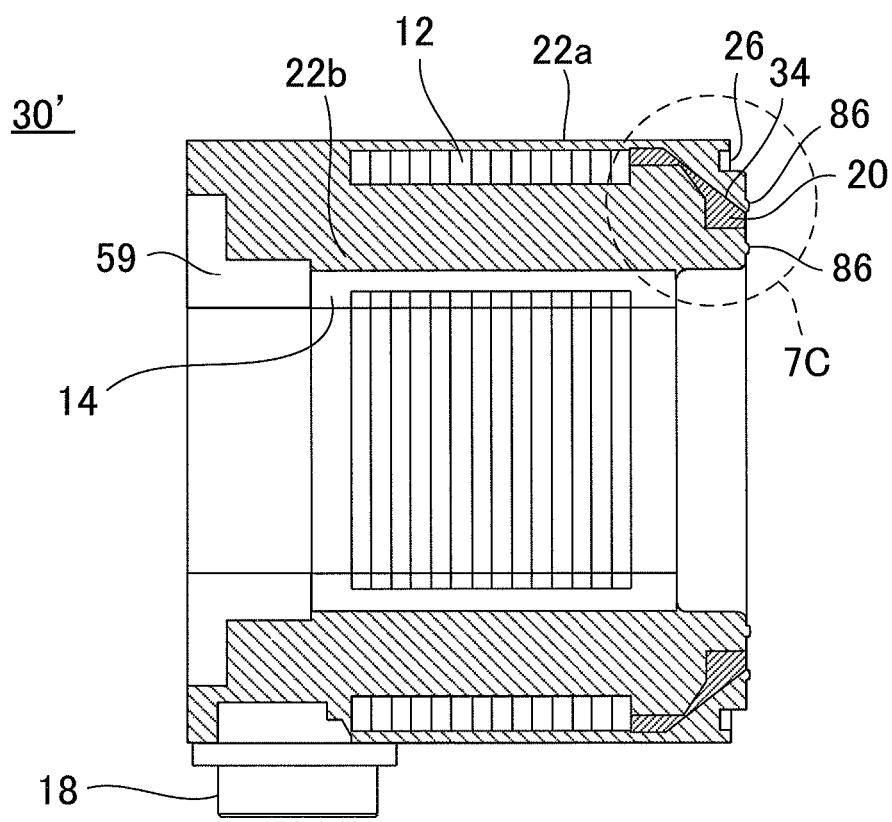
FIG. 7A is a schematic sectional view showing a stator according to a variant of the second embodiment before carrying out the after-process.
Figure 7B:
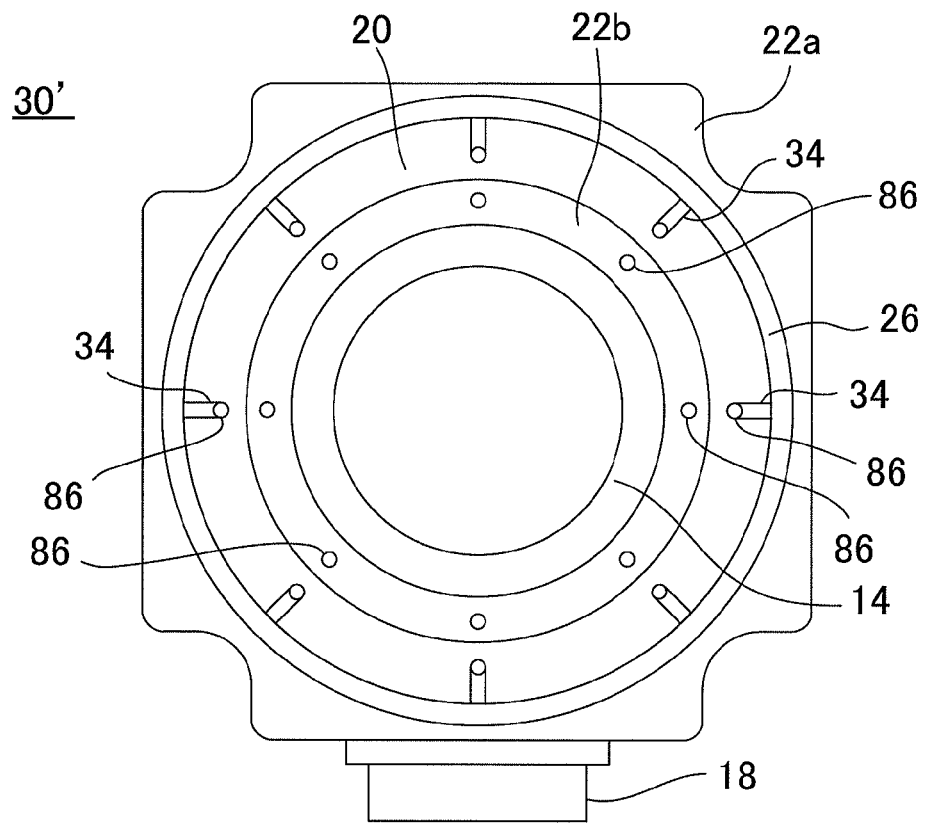
FIG. 7B is a side view showing the stator of FIG. 7A.
Figure 7C:
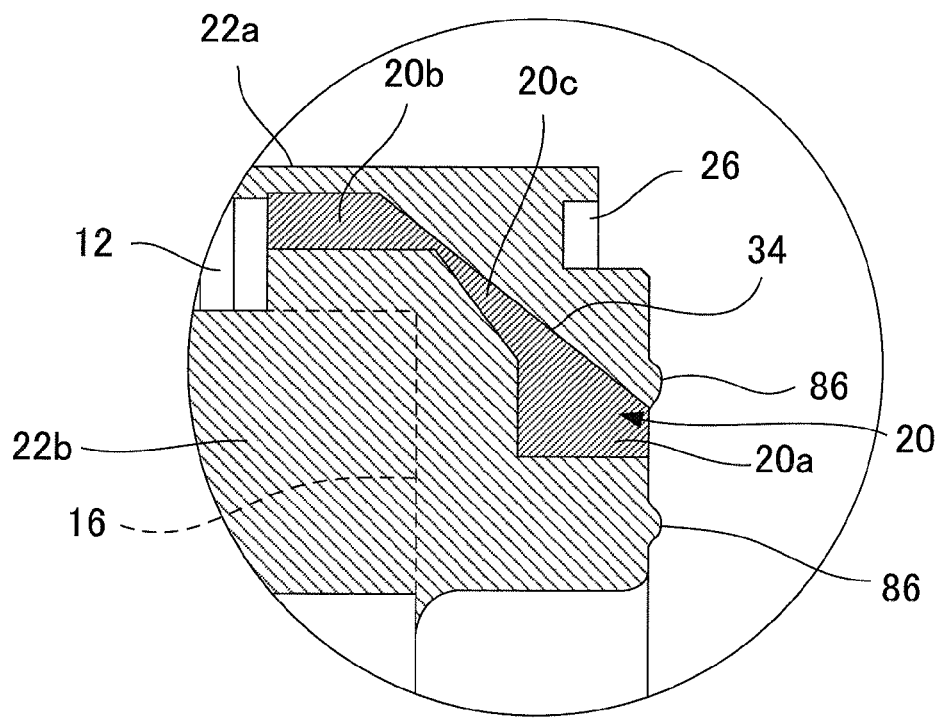
FIG. 7C is a partially enlarged view showing a region 7C of FIG. 7A.
Figure 8A:
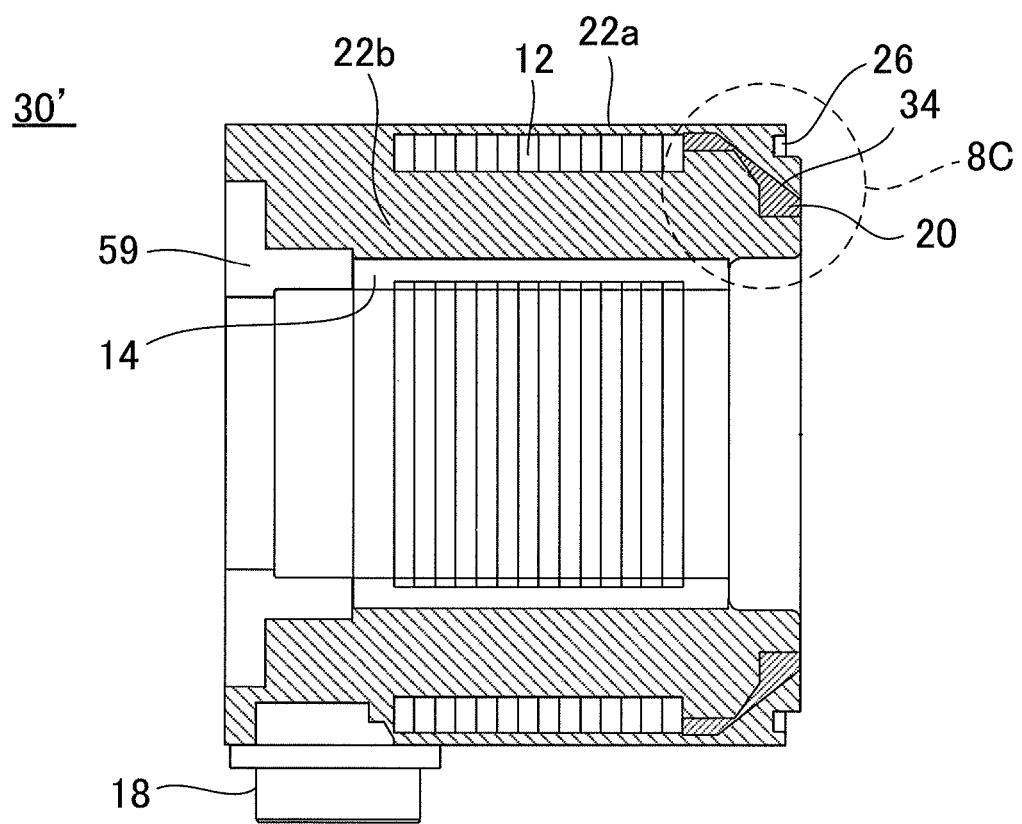
FIG. 8A is a schematic sectional view showing a stator according to the variant of the second embodiment after carrying out the after-process.
Figure 8B:
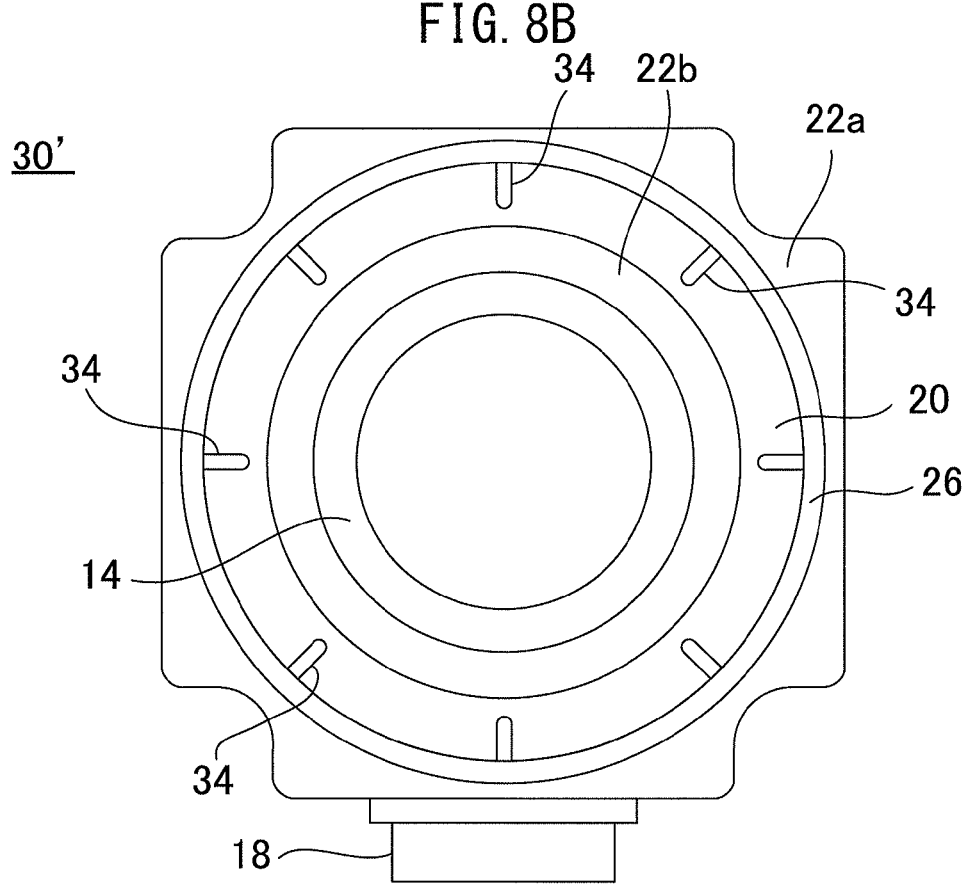
FIG. 8B is a side view showing the stator of FIG. 8A.
Figure 8C:
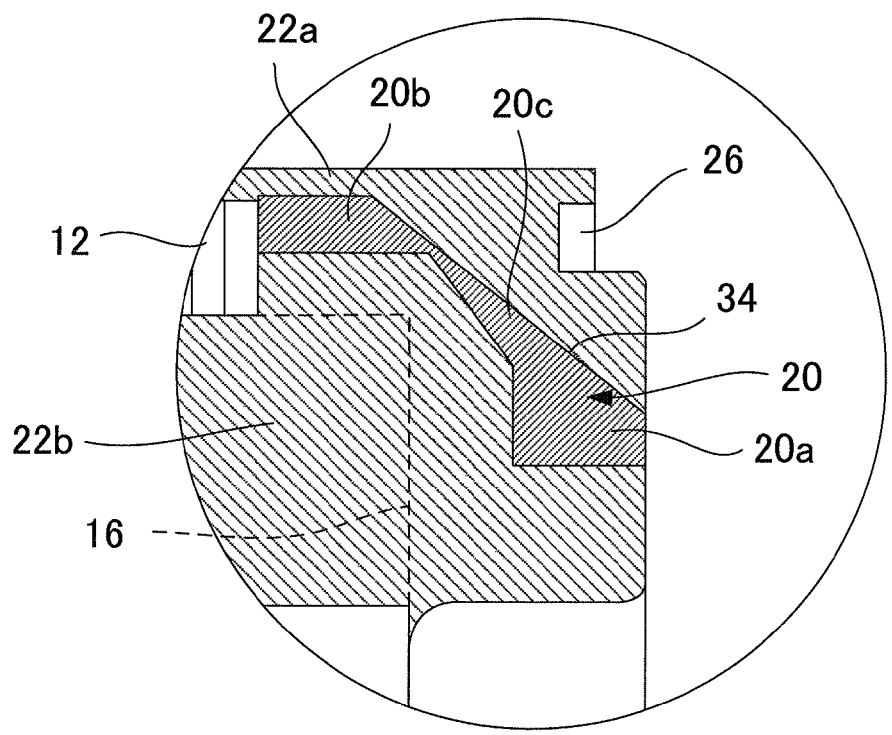
FIG. 8C is a partially enlarged view showing a region 8C of FIG. 8A.

A variant of the second embodiment will be described below. FIG. 7A is a schematic sectional view showing a stator 30' according to the variant of the second embodiment before the after process is carried out, and FIG. 7B is a side view thereof. FIG. 7C is a partially enlarged view showing a region 7C of FIG. 7A. FIG. 8A is a schematic sectional view showing the stator 30' after the after process is carried out, and FIG. 8B is a side view thereof. FIG. 8C is a partially enlarged view showing a region 8C of FIG. 8A. According to this variant, instead of the above-described through-hole 32, the housing 20 is formed with a flow path groove 34. As shown in FIG. 7B, the flow path groove 34 extends from the end face 20d of the housing 20 to the outer edge portion 20b.

The flow path groove 34 functions in the same manner as the above-described through-hole 32. Specifically, when the resin mold portion 22 is formed by means of the injection molding, resin is injected through the outer gate 82 into the flow path grove 34. The resin flows to the outer circumferential portion of the stator 30' through the flow path groove 34, forming the outer mold portion 22a.

EFFECT OF THE INVENTION

According to the stator configured as described above, by virtue of the partition member for partitioning the inner circumferential portion and the outer circumferential portion, during the injection molding process for forming the resin mold portion, resin is injected into the outer circumferential portion of the stator in a passage bifurcated from a resin flow which is injected from the axial end portion of the stator into the inner circumferential portion of the stator. Accordingly, sufficiently high injecting pressure is applied onto resin flowing toward the outer circumferential portion. Accordingly, resin can be filled in the outer circumferential portion without a gap.

Although the various embodiments and variants of the present invention have been described, it will be obvious to a person skilled in the art that the intended function and effect of the present invention may also be achieved by other embodiments or variants. In particular, a constituent element of the above-described embodiments and variants may be omitted or replaced, or a known means may also be added thereto, without departing from the scope of the present invention. Further, it is obvious to a person skilled in the art that the present invention can be implemented by any combination of the features of the embodiments either explicitly or implicitly disclosed herein.

What is claimed is:

1. A stator of an electric motor comprising:
   a stator core which includes a core back and a plurality of teeth protruding inwardly from the core back; and
   a resin molding portion formed in an inner circumferential portion and an outer circumferential portion of the stator core by means of injection molding,
   the stator comprising a partition member provided in an axial end portion of the stator and adapted to partition the inner circumferential portion and the outer circumferential portion of the stator core,
   wherein the partitioning member makes resin injected from the axial end portion flow in a bifurcated passage into the inner circumferential portion and the outer circumferential portion.

2. The stator according to claim 1, wherein the partition member comprises a resin passage which allows resin to flow from the axial end portion of the stator to the outer circumferential portion.

3. The stator according to claim 2, wherein the resin passage is defined by a through-hole extending from an axial end face of the partition member to the outer circumferential portion of the stator core.

4. The stator according to claim 2, wherein the resin passage is defined by a groove extending from an axial end face of the partition member to the outer circumferential portion of the stator core.

5. The stator according to claim 1, further comprising a groove formed on an axial end face of the stator by means of the injection molding for forming the resin molding portion.

6. The stator according to claim 1, wherein the bifurcated passage includes a first passage in communication with the inner circumferential portion and a second passage in communication with the outer circumferential portion, the first a second passages being separated from each other by the partition member.

\* \* \* \* \*